(12) United States Patent
Gao et al.

(10) Patent No.: US 12,219,487 B2
(45) Date of Patent: Feb. 4, 2025

(54) COMMUNICATION METHOD AND APPARATUS

(71) Applicant: HUAWEI TECHNOLOGIES CO., LTD., Guangdong (CN)

(72) Inventors: Kuandong Gao, Chengdu (CN); Huang Huang, Chengdu (CN); Mao Yan, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 667 days.

(21) Appl. No.: 17/365,368

(22) Filed: Jul. 1, 2021

(65) Prior Publication Data
US 2021/0329560 A1 Oct. 21, 2021

Related U.S. Application Data

(63) Continuation of application No. PCT/CN2019/130105, filed on Dec. 30, 2019.

(30) Foreign Application Priority Data

Jan. 11, 2019 (CN) .......................... 201910028760.6

(51) Int. Cl.
*H04W 52/02* (2009.01)
*H04W 76/28* (2018.01)

(52) U.S. Cl.
CPC ... *H04W 52/0235* (2013.01); *H04W 52/0232* (2013.01); *H04W 76/28* (2018.02); *H04W 52/0229* (2013.01)

(58) Field of Classification Search
CPC . H04W 76/28; H04W 52/0235; H04W 72/23; H04W 52/02; H04W 52/0216
See application file for complete search history.

(56) References Cited

U.S. PATENT DOCUMENTS 10,159,005 B2 12/2018 Siomina
11,096,238 B2 * 8/2021 Yang ..................... H04W 72/23
(Continued)

FOREIGN PATENT DOCUMENTS

CN 101841823 A 9/2010
CN 102196586 A 9/2011
(Continued)

OTHER PUBLICATIONS

Extended European Search Report issued in European Application No. 19908962.4 on Nov. 9, 2021, 14 pages.
(Continued)

*Primary Examiner* — Nam T Huynh
(74) *Attorney, Agent, or Firm* — Fish & Richardson P.C.

(57) ABSTRACT

The present disclosure relates to communication methods. One example method includes within a first discontinuous reception (DRX) cycle, starting, by a terminal device, a first timer (for example, a DRX inactivity timer (drx-Inactivity-Timer)) when a physical downlink control channel (PDCCH) indicates a new transmission. When the first timer expires at or after a time position for sending an indication signal, the terminal device does not receive the indication signal, where the time position is configured by a network device for the terminal device, and the indication signal is used to indicate the terminal device to sleep.

10 Claims, 13 Drawing Sheets

(56) References Cited

U.S. PATENT DOCUMENTS

| | | | |
|---|---|---|---|
| 2016/0198408 A1 | 7/2016 | Jhang et al. | |
| 2018/0132292 A1 | 5/2018 | Yang et al. | |
| 2018/0332655 A1 | 11/2018 | Ang et al. | |
| 2020/0229092 A1* | 7/2020 | Wu | H04W 52/0219 |
| 2021/0298115 A1* | 9/2021 | Shi | H04W 76/28 |

FOREIGN PATENT DOCUMENTS

| | | |
|---|---|---|
| CN | 106604376 A | 4/2017 |
| CN | 107257564 A | 10/2017 |
| WO | 2016072787 A1 | 5/2016 |

OTHER PUBLICATIONS

Intel Corporation, "UE Adaptation to the traffic and UE power consumption characteristics," 3GPP TSG RAN WG1 Meeting #95, R1-1812513, Spokane, USA, Nov. 12-16, 2018, 12 pages.

Qualcomm Incorporated, "Advanced Grant Indication for UE Power Saving," 3GPP TSG RAN WG1 NR Ad-Hoc#2, R1-1711187, Qingdao, P.R. China, Jun. 27-30, 2017, 5 pages.

1 Office Action issued in Indian Application No. 202137027384 on Mar. 1, 2022, 6 pages.

PCT International Search Report and Written Opinion issued in International Application No. PCT/CN2019/130105 on Apr. 2, 2020, 17 pages (with English translation).

* cited by examiner

COMMUNICATION METHOD AND APPARATUS

CROSS-REFERENCE TO RELATED APPLICATIONS

This application is a continuation of International Application No. PCT/CN2019/130105, filed on Dec. 30, 2019, which claims priority to Chinese Patent Application No. 201910028760.6, filed on Jan. 11, 2019. The disclosures of the aforementioned applications are hereby incorporated by reference in their entireties.

TECHNICAL FIELD

This application relates to the communications field and, more specifically, to a communication method and apparatus.

BACKGROUND

Power consumption of terminal devices needs to be considered in wireless communication. To reduce power consumption of a terminal device, a quantity of signals received by the terminal device or signal detection duration may be reduced.

In a current technology, a discontinuous reception (DRX) cycle is used to reduce power consumption of a terminal device. The DRX cycle is a specific cycle configured by a network device for a terminal device in connected mode. Within the DRX cycle, data is detected only in a specific period of time, and is not detected in other time. The specific period of time may be referred to as an active time, and the other time is referred to as a sleep time. In the active time, a discontinuous reception on duration timer (drx-OnDurationTimer) is used for timing. Within the DRX cycle, the terminal device detects data only in a period of time from startup to timeout of the drx-OnDurationTimer (that is, the terminal device detects data only in the active time, and does not detect data in the sleep time), as shown in FIG. 1.

In a timing period of the drx-OnDurationTimer, when the terminal device receives a physical downlink control channel (PDCCH) indicating a new transmission (PDCCH indicates a new transmission), the terminal device starts another timer, that is, a discontinuous reception inactivity timer (drx-InactivityTimer), and listens to the PDCCH during running of the drx-InactivityTimer, as shown in a black block in FIG. 2. In a timing period of the drx-Inactivity-Timer, the terminal device receives again the PDCCH indicating a new transmission, and restarts the drx-Inactivity-Timer.

To further reduce power consumption of the terminal device, currently, the industry proposes to introduce a signal indicating the terminal device to sleep, for example, a go-to-sleep signal (GTSS). When receiving the GTSS, the terminal device may not listen to the PDCCH, thereby reducing power consumption.

There is an unresolved problem in the current technology: How the terminal device performs an operation when receiving, during running of the drx-InactivityTimer, a signal indicating the terminal device to sleep.

SUMMARY

According to a first aspect, this application provides a communication method, including: within a first discontinuous reception (DRX) cycle, starting, by a terminal device, a first timer when a physical downlink control channel (PDCCH) indicates a new transmission; receiving, before the first timer expires, an indication signal used to indicate the terminal device to sleep; and skipping listening to the PDCCH from a moment at which the indication signal is received to a moment at which an active time of a next DRX cycle of the first DRX cycle ends; skipping listening to the PDCCH in an active time of a next DRX cycle of the first DRX cycle; skipping listening to the PDCCH from a moment at which the first timer expires to a moment at which an active time of a next DRX cycle of the first DRX cycle ends; or skipping listening to the PDCCH from a moment at which an active time of a next DRX cycle of the first DRX cycle starts to a moment at which the first timer expires, where the first timer expires after the active time of the next DRX cycle of the first DRX cycle starts and before the active time of the next DRX cycle ends, or the first timer expires after the active time of the next DRX cycle of the first DRX cycle ends.

In a possible implementation, when the first timer expires after the active time of the next DRX cycle of the first DRX cycle starts and before the active time of the next DRX cycle ends, the PDCCH is not listened to from the moment at which the indication signal is received to the moment at which the active time of the next DRX cycle of the first DRX cycle ends, and timing of the first timer is stopped when the active time of the next DRX cycle of the first DRX cycle starts.

In a possible implementation, when the first timer expires after the active time of the next DRX cycle of the first DRX cycle starts and before the active time of the next DRX cycle ends, the PDCCH is not listened to in the active time of the next DRX cycle of the first DRX cycle, and timing of the first timer is stopped when the active time of the next DRX cycle of the first DRX cycle starts.

In a possible implementation, when the first timer expires after the active time of the next DRX cycle of the first DRX cycle ends, the PDCCH is not listened to from the moment at which the indication signal is received to the moment at which the active time of the next DRX cycle of the first DRX cycle ends, and timing of the first timer is stopped when the active time of the next DRX cycle of the first DRX cycle starts.

In a possible implementation, when the first timer expires after the active time of the next DRX cycle of the first DRX cycle ends, the PDCCH is not listened to in the active time of the next DRX cycle of the first DRX cycle, and timing of the first timer is stopped when the active time of the next DRX cycle of the first DRX cycle starts.

In a possible implementation, when the first timer expires after the active time of the next DRX cycle of the first DRX cycle ends, the PDCCH is not listened to from the moment at which the indication signal is received to the moment at which the first timer expires, and timing of a second timer is stopped, where the second timer is used for timing an active time of a DRX cycle.

In a possible implementation, the first timer is a discontinuous reception inactivity timer (drx-InactivityTimer).

In a possible implementation, the second timer is a discontinuous reception on duration timer (drx-Onduration-Timer).

In a possible implementation, the indication signal is a go-to-sleep signal (GTSS).

In a possible implementation, the method further includes: receiving, by the terminal device, a control resource set from a network device, where the control resource set is used to receive the indication signal.

In a possible implementation, both the first DRX cycle and a second DRX cycle are short DRX cycles; or the first DRX cycle is a short DRX cycle, and a second DRX cycle is a long DRX cycle.

According to a second aspect, this application provides an apparatus, including: a processing unit, configured to: within a first discontinuous reception (DRX) cycle, start a first timer when a physical downlink control channel (PDCCH) indicates a new transmission; and a receiving unit, configured to receive, before the first timer expires, an indication signal used to indicate the apparatus to sleep. The processing unit is further configured to: skip listening to the PDCCH from a moment at which the indication signal is received to a moment at which an active time of a next DRX cycle of the first DRX cycle ends; skip listening to the PDCCH in an active time of a next DRX cycle of the first DRX cycle; skip listening to the PDCCH from a moment at which the first timer expires to a moment at which an active time of a next DRX cycle of the first DRX cycle ends; or skip listening to the PDCCH from a moment at which an active time of a next DRX cycle of the first DRX cycle starts to a moment at which the first timer expires, where the first timer expires after the active time of the next DRX cycle of the first DRX cycle starts and before the active time of the next DRX cycle ends, or the first timer expires after the active time of the next DRX cycle of the first DRX cycle ends.

In a possible implementation, the processing unit is configured to: when the first timer expires after the active time of the next DRX cycle of the first DRX cycle starts and before the active time of the next DRX cycle ends, skip listening to the PDCCH from the moment at which the indication signal is received to the moment at which the active time of the next DRX cycle of the first DRX cycle ends, and stop timing of the first timer when the active time of the next DRX cycle of the first DRX cycle starts.

In a possible implementation, the processing unit is configured to: when the first timer expires after the active time of the next DRX cycle of the first DRX cycle starts and before the active time of the next DRX cycle ends, skip listening to the PDCCH in the active time of the next DRX cycle of the first DRX cycle, and stop timing of the first timer when the active time of the next DRX cycle of the first DRX cycle starts.

In a possible implementation, the processing unit is configured to: when the first timer expires after the active time of the next DRX cycle of the first DRX cycle ends, skip listening to the PDCCH from the moment at which the indication signal is received to the moment at which the active time of the next DRX cycle of the first DRX cycle ends, and stop timing of the first timer when the active time of the next DRX cycle of the first DRX cycle starts.

In a possible implementation, the processing unit is configured to: when the first timer expires after the active time of the next DRX cycle of the first DRX cycle ends, skip listening to the PDCCH in the active time of the next DRX cycle of the first DRX cycle, and stop timing of the first timer when the active time of the next DRX cycle of the first DRX cycle starts.

In a possible implementation, the processing unit is configured to: when the first timer expires after the active time of the next DRX cycle of the first DRX cycle ends, skip listening to the PDCCH from the moment at which the indication signal is received to the moment at which the first timer expires, and stop timing of a second timer, where the second timer is used for timing an active time of a DRX cycle.

According to a third aspect, a communications apparatus is provided. The communications apparatus includes a memory and a processor, the memory is configured to store instructions, the processor is configured to execute the instructions stored in the memory, and execution of the instructions stored in the memory enables the processor to perform the method according to any one of the first aspect or the possible implementations of the first aspect.

According to a fourth aspect, a chip is provided, and the chip includes a processing module and a communications interface. The processing module is configured to control the communications interface to communicate with the outside, and the processing module is further configured to implement the method in the first aspect or any possible implementation of the first aspect.

According to a fifth aspect, a computer-readable storage medium is provided. The computer-readable storage medium stores a computer program. When the computer program is executed by a computer, the computer is enabled to implement the method in the first aspect or any possible implementation of the first aspect.

According to a sixth aspect, a computer program product including instructions is provided. When the instructions are executed by a computer, the computer is enabled to implement the method in the first aspect or any possible implementation of the first aspect.

This application provides a plurality of technical solutions about how the terminal device performs an operation when a signal indicating the terminal device to sleep is received during running of the drx-InactivityTimer. These technical solutions can effectively reduce power consumption of the terminal device.

DESCRIPTION OF EMBODIMENTS

The following describes technical solutions in this application with reference to the accompanying drawings.

Unless otherwise defined, all technical and scientific terms used herein have the same meaning as commonly understood by a person skilled in the art to which this application pertains. The terms used in the specification of this application are merely for the purpose of describing specific embodiments and are not intended to limit this application.

Embodiments of this application may be applied to a communications system, such as a 5G system or a new radio (NR) system.

Figure 3:
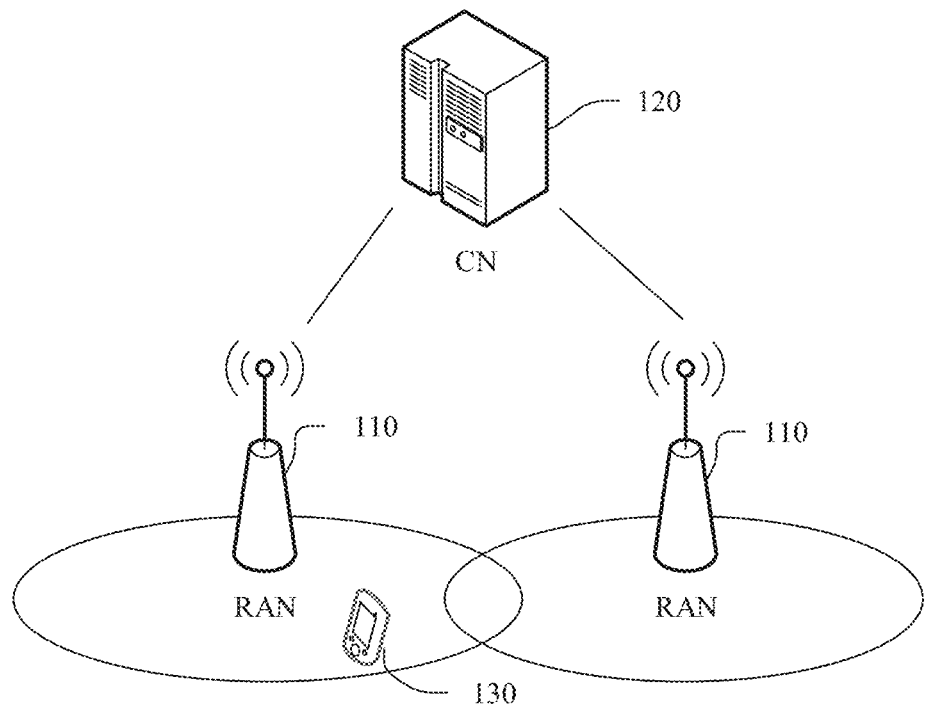
FIG. 3 is a schematic structural diagram of a network according to this application.

FIG. 3 is a schematic diagram of an application scenario according to this application. As shown in FIG. 3, a terminal 130 accesses a wireless network, to obtain a service from an external network (for example, the internet) over the wireless network or communicate with another terminal over the wireless network. The wireless network includes a RAN 110 and a core network (CN) 120. The RAN 110 is used to enable the terminal 130 to access the wireless network, and the CN 120 is used to manage the terminal and provide a gateway for communicating with the external network.

A network device may be a base station. The base station may be configured to communicate with one or more terminals, or may be configured to communicate with one or more base stations that have some terminal functions (for example, communication between a macro base station and a micro base station such as an access point). The base station may be a base transceiver station (BTS) in a time division synchronous code division multiple access (TD-SCDMA) system, an evolved NodeB (eNB) in an LTE system, or a gNodeB in a 5G system or a new radio (NR) system. Alternatively, the base station may be an access point (AP), a transmission node (TRP), a centralized unit (CU), or another network entity, and may include some or all of functions of the foregoing network entities.

The terminal device may be referred to as user equipment (UE), an access terminal, a subscriber unit, a subscriber station, a mobile station, a mobile console, a remote station, a remote terminal, a mobile device, a user terminal, a terminal, a wireless communications device, a user agent, a user apparatus, or the like. Alternatively, the terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, a terminal device in a future evolved public land mobile network (PLMN), or the like.

In the embodiments of this application, the terminal device or the network device includes a hardware layer, an operating system layer running on the hardware layer, and an application layer running on the operating system layer. The hardware layer includes hardware such as a central processing unit (CPU), a memory management unit (MMU), and a memory (which is also referred to as a main memory). The operating system may be any one or more of computer operating systems implementing service processing through a process, for example, a Linux operating system, a Unix operating system, an Android operating system, an iOS operating system, and a Windows operating system. The application layer includes applications such as a browser, an address book, word processing software, and instant messaging software. In addition, a specific structure of an execution body of a method provided in the embodiments of this application is not specifically limited in the embodiments of this application, provided that a program that records code for the method provided in the embodiments of this application can be run to perform communication according to the method provided in some embodiments of this application. For example, the method provided in the embodiments of this application may be performed by a terminal device, a network device, or a functional module that is in a terminal device or a network device and that can invoke and execute the program.

For ease of understanding the embodiments of this application, the following first briefly describes several technical terms in this application.

(1) DRX Cycle

A discontinuous reception (DRX) cycle is a period of time configured by the network device. For example, the DRX cycle may be 5 ms, 10 ms, or another value. The DRX cycle includes a short cycle and a long cycle. The network device may configure only the short cycle, only the long cycle, or both the short cycle and the long cycle for the terminal device.

Figure 1:
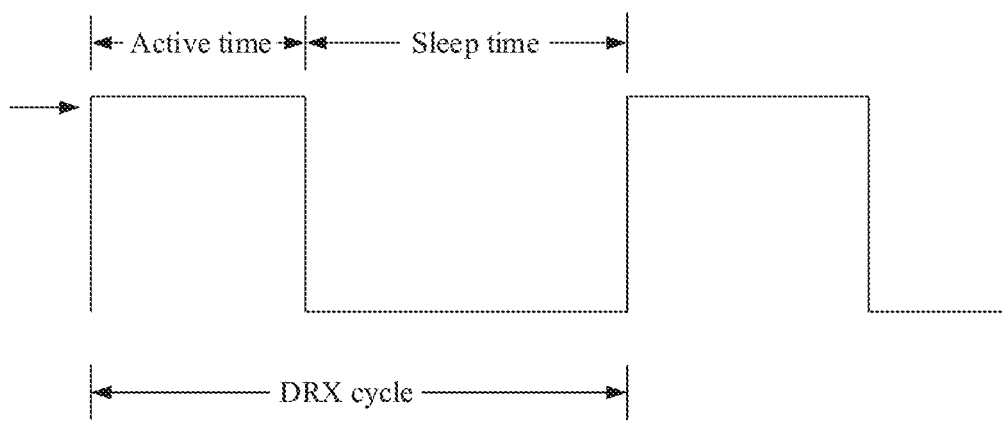
FIG. 1 is a schematic diagram of a DRX cycle.

A schematic diagram of a DRX mechanism is shown in FIG. 1. In time domain, time is divided into continuous DRX cycles. The DRX cycle includes an active time (timed by a drx-Ondurationtimer) and a sleep time. In the active time, the terminal device listens to a PDCCH. In the sleep time, the terminal device does not listen to or receive a downlink signal, to reduce power consumption.

The network device may configure the DRX cycle for the terminal device by configuring a timer. For example, a short DRX cycle timer (DrxshortCycleTimer) is configured to perform timing for the short cycle. When the DrxshortCycleTimer is started, the short DRX cycle starts to be timed. When the DrxshortCycleTimer expires, the short DRX cycle ends. For another example, a long DRX cycle timer (DrxlongCycleTimer) is configured to perform timing for the long cycle. When the DrxlongCycleTimer is started, the long DRX cycle starts to be timed. When the DrxlongCycleTimer expires, the long DRX cycle ends.

(2) DRX on Duration Timer (Drx-onDurationTimer)

Figure 2:
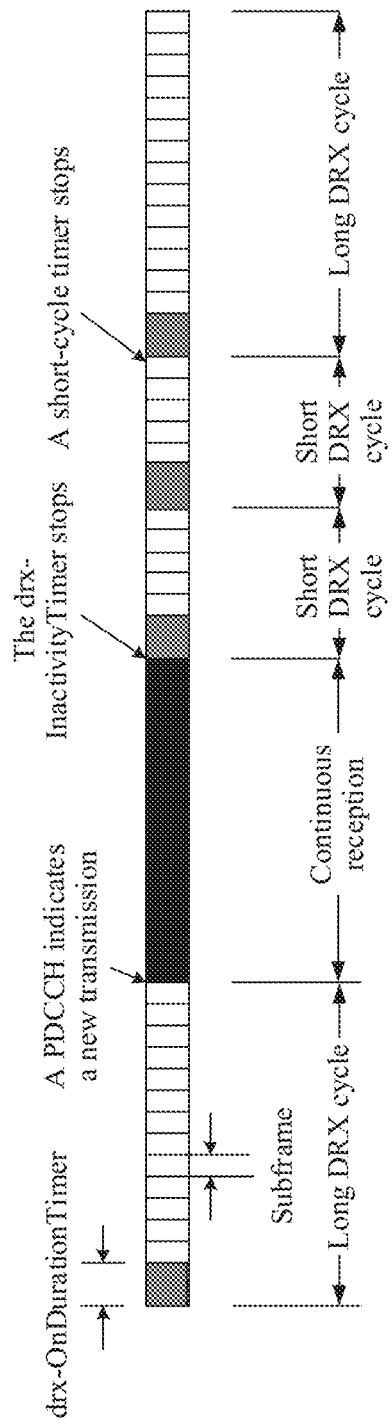
FIG. 2 is a schematic diagram of a short DRX cycle and a long DRX cycle.

The active time of the DRX cycle is timed by using the drx-onDurationTimer. After the drx-OnDurationTimer is started, the terminal device needs to listen to the PDCCH until the drx-onDurationTimer expires. When each new DRX cycle starts, the terminal device needs to start the timer. As shown in FIG. 2, the active time is a part of the DRX cycle. The drx-onDurationTimer is a timer corresponding to the active time. When the drx-onDurationTimer is started, the terminal device enters the active time until the drx-onDurationTimer expires. A time length of the drx-OndurationTimer is also configured by the network device. For example, the time length of the drx-OndurationTimer is configured to be two slots by using a higher-layer parameter.

If both the short DRX cycle and the long DRX cycle are configured for the terminal device, lengths of the drx-onDurationTimer in the two DRX cycles may be the same or may be different.

Optionally, when the following conditions are met, the terminal device starts the drx-OndurationTimer timer within the DRX cycle:

When the terminal device is in the short DRX cycle, the following condition is met:

$$[(SFN*10)+\text{Subframe number}]\text{modulo}(\text{shortDRX-Cycle})=(\text{drxStartOffset})\text{modulo }(\text{shortDRX-Cycle})$$

When the terminal device is in the long DRX cycle, the following condition is met:

$$[(SFN*10)+\text{Subframe number}]\text{modulo}(\text{longDRX-Cycle})=\text{drxStartOffset}$$

The SFN represents a current system frame number; the subframe number represents a subframe number; modulo represents a remainder operation or a modulo operation; shortDRX-Cycle represents the short DRX cycle; drxstartoffset represents a start position of the DRX cycle, where the start position of the DRX cycle may be in a unit of a subframe, a slot, or a symbol, for example, a subframe 0 is the start position of the DRX cycle, or a symbol 1 is the start position of the DRX cycle; and longDRX-Cycle represents the long DRX cycle.

(3) DRX Inactivity Timer (Drx-InactivityTimer)

When the terminal device is in the active time of the DRX cycle, and the PDCCH indicates a new transmission, the terminal device starts a DRX inactivity timer (drx-InactivityTimer), and listens to the PDCCH in each downlink subframe in a timing period of the drx-InactivityTimer. During running of the drx-InactivityTimer, when the terminal device receives the PDCCH indicating a new transmission, the terminal device restarts the drx-InactivityTimer. A time length of the drx-InactivityTimer is also configured by the network device. For example, the time length of the drx-InactivityTimer is configured to be one slot by using a higher-layer parameter.

When the drx-InactivityTimer expires, if only the long DRX cycle is configured for the terminal device, the terminal device directly enters the long DRX cycle. If both the short DRX cycle and the long DRX cycle are configured for the terminal device, when the drx-InactivityTimer expires, the terminal device directly enters the short DRX cycle and starts (or restarts) the short DRX cycle timer (DrxshortCycleTimer). When the short cycle timer (DrxshortCycleTimer) expires, the terminal device enters the long DRX cycle, and starts the DrxlongCycleTimer.

(4) Indication Signal (which may also be Referred to as a Signal Used to Save Power or a Power Saving Signal)

To further reduce power consumption of the terminal device, the indication signal is introduced for DRX. The indication signal is configured by the network device for the terminal device based on a measurement requirement of the PDCCH. The indication signal may include two types, a first type indicates the terminal device to sleep and a second type indicates the terminal device to be activated.

For example, when the terminal device needs to listen to the PDCCH in an active time (or a part of the active time) of a next DRX cycle, the network device indicates, by using an indication signal, the terminal device to listen to the PDCCH in the active time (or the part of the active time) of the next DRX cycle. When the terminal device does not need to listen to the PDCCH in an active time of a next DRX cycle, the network device indicates, by using an indication signal, the terminal device to sleep in the active time of the next DRX cycle.

The indication signal may be configured in the following two manners.

First manner of configuring the indication signal: The network device indicates, by using different status values of the indication signal, whether the terminal device is to sleep or to be activated in the active time of the next DRX cycle.

For example, the indication signal has two status values "0" and "1". When the status value of the indication signal is "0", it indicates the terminal device is to sleep in the active time of the next DRX cycle. When the status value of the indication signal is "1", it indicates that the terminal device is to listen to the PDCCH in the active time of the next DRX cycle.

Second manner of configuring the indication signal: The network device indicates, by determining whether to configure the indication signal, whether the terminal device is to sleep or to be activated in the active time of the next DRX cycle.

For example, when the terminal device does not receive the indication signal at a specific time position, it indicates that the terminal device is to sleep in the active time of the next DRX cycle. When the terminal device receives the indication signal at a specific time position, it indicates that the terminal device is to be activated in the active time of the next DRX cycle.

The specific time position may be configured by the network device. For example, the network device pre-configures the terminal device to detect the indication signal in the first slot of the first subframe, or the network device pre-configures the terminal device to detect the indication signal at a position of two OFDM symbols before the active time of the next DRX cycle.

The indication signal may be a wake-up signal (WUS), or may be a go-to-sleep signal (GTSS). Alternatively, the indication signal may be another signal. For example, the indication signal is any one of the following signals: a channel state information reference signal (CSI-RS), a demodulation reference signal (DMRS), a tracking reference signal (TRS), or a synchronization signal/physical broadcast channel block (SS/PBCH block).

The indication signal may be a sequence, or may be a data signal. When the indication signal is a data signal, the indication signal may be any one of the following: DCI, a physical downlink shared channel (PDSCH), a MAC-CE, or RRC.

Figure 4:
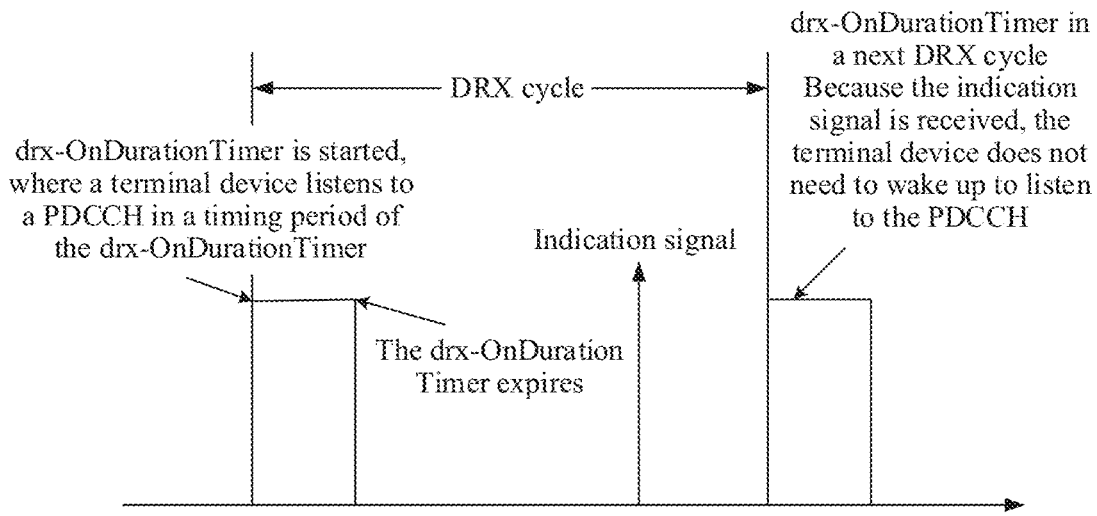
FIG. 4 is a schematic diagram of a DRX cycle according to this application.

FIG. 4 is a schematic diagram of introducing an indication signal into a DRX mechanism. As shown in FIG. 4, a WUS is used as an example. A network device pre-indicates a time position at which a terminal device needs to detect a WUS signal, for example, indicates the terminal device to detect a WUS in which subframe, indicates the terminal device to detect a WUS in which slot, or indicates the terminal device to detect a WUS at a position with a specific offset value of an active time of a DRX cycle. The terminal device performs blind detection at the indicated time position. If the WUS is detected, the terminal device listens to the PDCCH in the active time of the next DRX cycle. If the terminal device does not detect the WUS at the indicated time position, the terminal device sleeps again until the active time of the next DRX cycle arrives.

In the descriptions of this application, unless otherwise specified, "I" means "or". For example, A/B may represent A or B. The term "and/or" in this specification describes only an association relationship for describing associated objects and represents that there may be three relationships. For example, A and/or B may represent the following three cases: Only A exists, both A and B exist, and only B exists. In addition, "at least one" means one or more, and "a plurality of" means two or more. Words such as "first" and "second" do not limit a quantity and an execution sequence, and the words such as "first" and "second" do not indicate a definite difference.

This application is used in three scenarios, which are separately described below.

Scenario 1

Figure 5A:
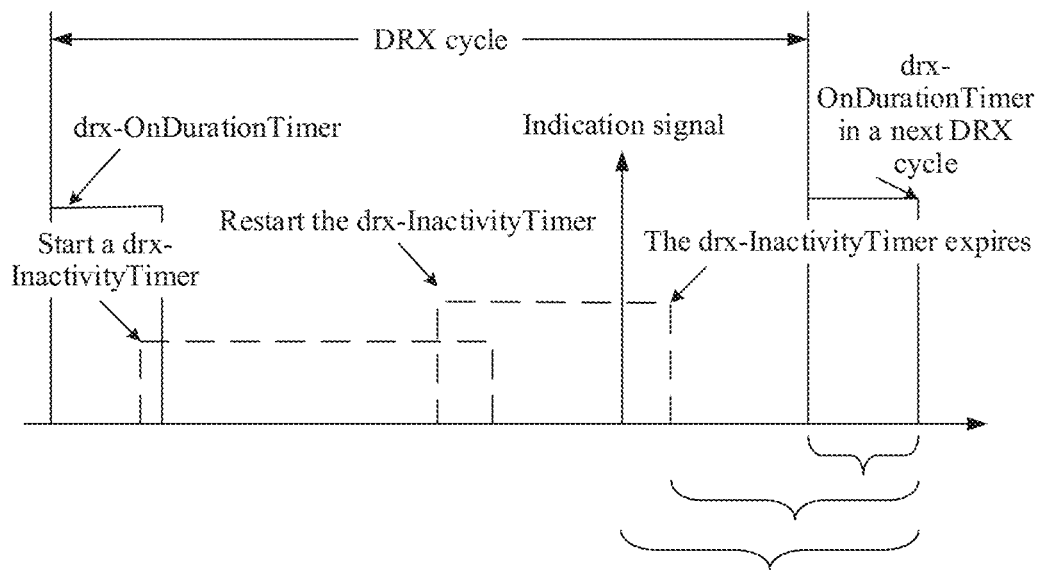
FIG. 5A is a schematic diagram of a relationship between an indication signal and a timer according to this application.

In the scenario 1, total timing duration of a drx-InactivityTimer in a first DRX cycle does not cover or overlap an active time of a next DRX cycle. That is, the drx-InactivityTimer in the first DRX cycle expires before a drx-OndurationTimer in the next DRX cycle is started, or the drx-Inactivitytimer in the first DRX cycle expires before the active time of the next DRX cycle starts, as shown in FIG. 5A. In a timing period of a drx-OndurationTimer in the first DRX cycle (that is, an active time of the DRX cycle), if it is determined that a PDCCH indicates a new transmission, the drx-InactivityTimer (the first dashed box in FIG. 5A) is started. In a timing period of the drx-InactivityTimer, if it is determined again that the PDCCH indicates a new transmission, the drx-InactivityTimer is restarted (the second dashed box in FIG. 5A), and the drx-InactivityTimer expires before the drx-OndurationTimer in the next DRX cycle is started (that is, before the active time of the DRX cycle starts).

It should be understood that in one DRX cycle, the drx-InactivityTimer may not be restarted, or may be restarted for a plurality of times. This is not limited in this application. In FIG. 5A, one time of restart is used as an example. In the scenario 1, this application provides Embodiment 1 about how a terminal device performs an operation when an indication signal is received.

Embodiment 1

In the scenario 1, as shown in FIG. 5A, when the indication signal is used to indicate the terminal device to sleep, the terminal device may skip listening to the PDCCH from a time domain position at which the indication signal is received to a moment at which the active time of the next DRX cycle ends, for example, a time period indicated by a largest angle bracket in FIG. 5A; may skip listening to the PDCCH from a moment at which a first timer expires to a moment at which the active time of the next DRX cycle ends, for example, a time period indicated by a second largest angle bracket in FIG. 5A; or may skip listening to the PDCCH only in the active time of the next DRX cycle, for example, a time period indicated by a smallest angle bracket in FIG. 5A.

The time domain position at which the indication signal is received is a slot in which the indication signal is received, a symbol in which the indication signal is received, or a subframe in which the indication signal is received. A position after the time domain position at which the indication signal is received is a next slot of the slot in which the indication signal is received, or a next symbol of the symbol in which the indication signal is received, or a next subframe of the subframe in which the indication signal is received.

It should be understood that, that the terminal device does not listen to the PDCCH in this application may also be understood as that the terminal device does not detect downlink data, does not receive downlink control information (DCI), sleeps, or the like.

In the scenario 1, when the indication signal is used to indicate the terminal device to be activated or to wake up, the terminal device may listen to the PDCCH when receiving the indication signal, until the active time of the next DRX cycle ends; may not listen to the PDCCH within a time interval between expiration of the drx-InactivityTimer and startup of the drx-OndurationTimer and listens to the PDCCH after the drx-OndurationTimer in the next DRX cycle is started; or may not listen to the PDCCH within a time interval between receiving of the indication signal and startup of the drx-OndurationTimer in the next DRX cycle, and listens to the PDCCH only after the drx-OndurationTimer in the next DRX cycle is started.

Correspondingly, for the scenario 1, this application provides a communication method 500A, including the following steps.

S510. Within a first discontinuous reception (DRX) cycle, a terminal device starts a first timer when a physical downlink control channel (PDCCH) indicates a new transmission.

S520. Before the first timer expires, a network device sends an indication signal used to indicate the terminal device to sleep.

S530. The terminal device does not listen to the PDCCH from a moment at which the indication signal is received to a moment at which an active time of a next DRX cycle of the first DRX cycle ends; does not listen to the PDCCH in an active time of a next DRX cycle of the first DRX cycle; or does not listen to the PDCCH from a moment at which the first timer expires to a moment at which an active time of a next DRX cycle of the first DRX cycle ends.

The first timer expires before the active time of the next DRX cycle of the first DRX cycle starts.

The first timer is a drx-InactivityTimer.

It should be understood that the first timer expires before the active time of the next DRX cycle of the first DRX cycle starts. "Expiring" herein may mean that the first timer has never been restarted from a moment of startup to a moment of expiration, or mean that the first timer is restarted for one or more times after the first timer is started, until the first timer expires.

In the technical solution provided in the method 500A, the terminal device may sleep immediately after receiving the indication signal, or may sleep in the active time of the next DRX cycle after receiving the indication signal. In this manner, power consumption of the terminal can be reduced.

In addition, this application further provides a communication method 500B, including the following steps.

S501. Within a first discontinuous reception (DRX) cycle, a terminal device starts a first timer when a physical downlink control channel (PDCCH) indicates a new transmission.

S502. Before the first timer expires, a network device sends an indication signal used to indicate the terminal device to wake up or to be activated.

S503. Listen to the PDCCH at or after a time domain position at which the indication signal is received, until an active time of a next DRX cycle ends; skip listening to the PDCCH within a time interval between expiration of the first timer and startup of a drx-OndurationTimer in a next DRX cycle, and listen to the PDCCH only when an active time of the next DRX cycle starts; or skip listening to the PDCCH within a time interval between a time domain position at which the indication signal is received or a position after a time domain position at which the indication signal is received and a moment at which a drx-OndurationTimer in a next DRX cycle is started, and listen to the PDCCH only after the drx-OndurationTimer in the next DRX cycle is started.

The first timer expires before the active time of the next DRX cycle of the first DRX cycle starts.

The first timer is a drx-InactivityTimer.

It should be understood that the active time of the next DRX cycle of the first DRX cycle may also be represented as a period of time from startup to expiration of the drx-Ondurationtimer in the next DRX cycle of the first DRX cycle. In this application, for ease of description, the active time is used for representation in some places, and the drx-OndurationTimer is used for representation in some places. The two representations may be replaced with each other.

It should be understood that the first timer expires before the active time of the next DRX cycle of the first DRX cycle starts. "Expiring" herein may mean that the first timer has never been restarted from a moment of startup to a moment of expiration, or mean that the first timer is restarted for one or more times after the first timer is started, until the first timer expires.

The time domain position at which the indication signal is received is a slot in which the indication signal is received, a symbol in which the indication signal is received, or a subframe in which the indication signal is received. A position after the time domain position at which the indication signal is received is a next slot of the slot in which the indication signal is received, or a next symbol of the symbol in which the indication signal is received, or a next subframe of the subframe in which the indication signal is received.

In the technical solution provided in the method 500B, the terminal device may wake up immediately after receiving the indication signal, may wake up after the drx-InactivityTimer expires, or may wake up after the active time of the next DRX cycle starts.

Scenario 2

Figure 6A:
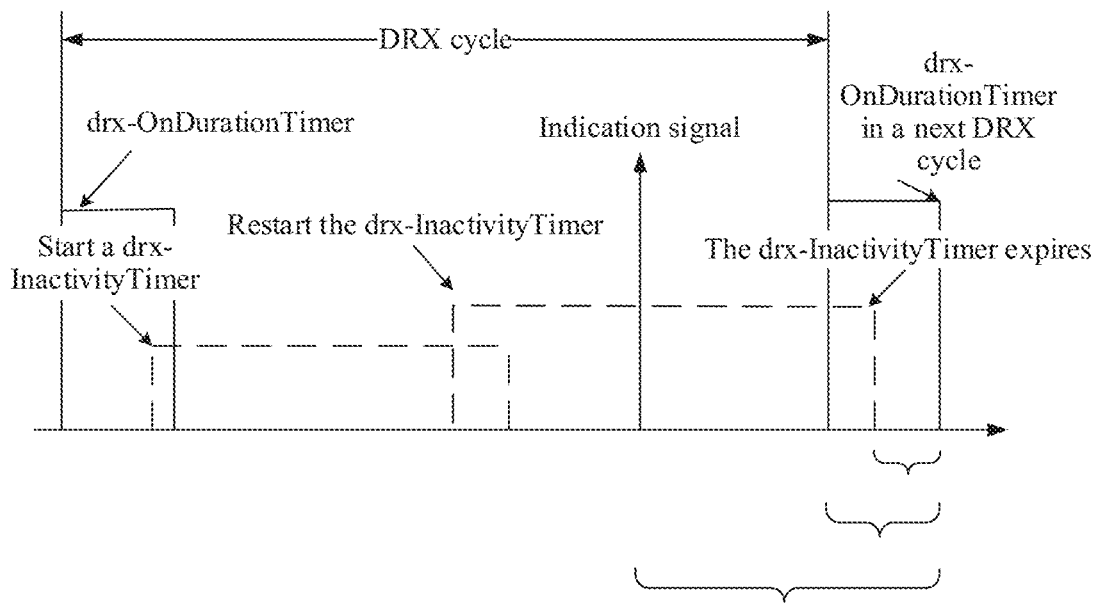
FIG. 6A is another schematic diagram of a relationship between an indication signal and a timer according to this application.

In the scenario 2, timing duration of a drx-InactivityTimer in a first DRX cycle partially overlaps timing duration of a drx-OndurationTimer in a second cycle. To be specific, the drx-InactivityTimer in the first DRX cycle expires after a drx-OndurationTimer in a next DRX cycle is started, and the duration partially overlaps in terms of time. Alternatively, the drx-Inactivitytimer in the first DRX cycle expires after an active time of a next DRX cycle starts and before the active time of the next DRX cycle ends, as shown in FIG. 6A. In a timing period of the drx-OndurationTimer in the first DRX cycle, if it is determined that a PDCCH indicates a new transmission, the drx-InactivityTimer is started (the first dashed box in FIG. 6A). When it is determined that the PDCCH indicates a new transmission again, the drx-InactivityTimer is restarted (as shown in the second dashed line box in FIG. 6A). After the drx-OndurationTimer in the next DRX cycle is started, the drx-InactivityTimer expires, and the drx-InactivityTimer expires earlier than the drx-OndurationTimer in the next DRX cycle.

It should be understood that in one DRX cycle, the drx-InactivityTimer may not be restarted, or may be restarted for a plurality of times. This is not limited in this application. In FIG. 6A, one time of restart is used as an example. In the scenario 2, this application provides Embodiment 2 about how a terminal device performs an operation when an indication signal is received.

Embodiment 2

In the scenario 2, as shown in FIG. 6A, when the indication signal is used to indicate the terminal device to sleep, the terminal device may skip listening to the PDCCH from a time domain position at which the indication signal is received to a moment at which the active time of the next DRX cycle ends, for example, a time period indicated by a largest angle bracket in FIG. 6A; may skip listening to the PDCCH only in the active time of the next DRX cycle, for example, a time period indicated by a second angle bracket in FIG. 6A; or may skip listening to the PDCCH from a moment at which a first timer expires to a moment at which the active time of the next DRX cycle ends, for example, a time period indicated by a smallest angle bracket in FIG. 6A.

Specifically, the terminal device may further perform the following operation on the timer:

At the time domain position at which the indication signal is received, timing of the drx-InactivityTimer may be stopped. Alternatively, timing of the drx-InactivityTimer is stopped at a position at which the drx-OndurationTimer in the next DRX cycle is started.

In the scenario 2, when the indication signal indicates the terminal device to wake up or to be activated, the terminal device may listen to the PDCCH in a timing period of the drx-InactivityTimer and timing of the drx-OndurationTimer in the next DRX cycle; listen to the PDCCH only in a timing period of the drx-InactivityTimer; or listen to the PDCCH only in a timing period of the drx-OndurationTimer in the next DRX cycle.

Figure 6B:
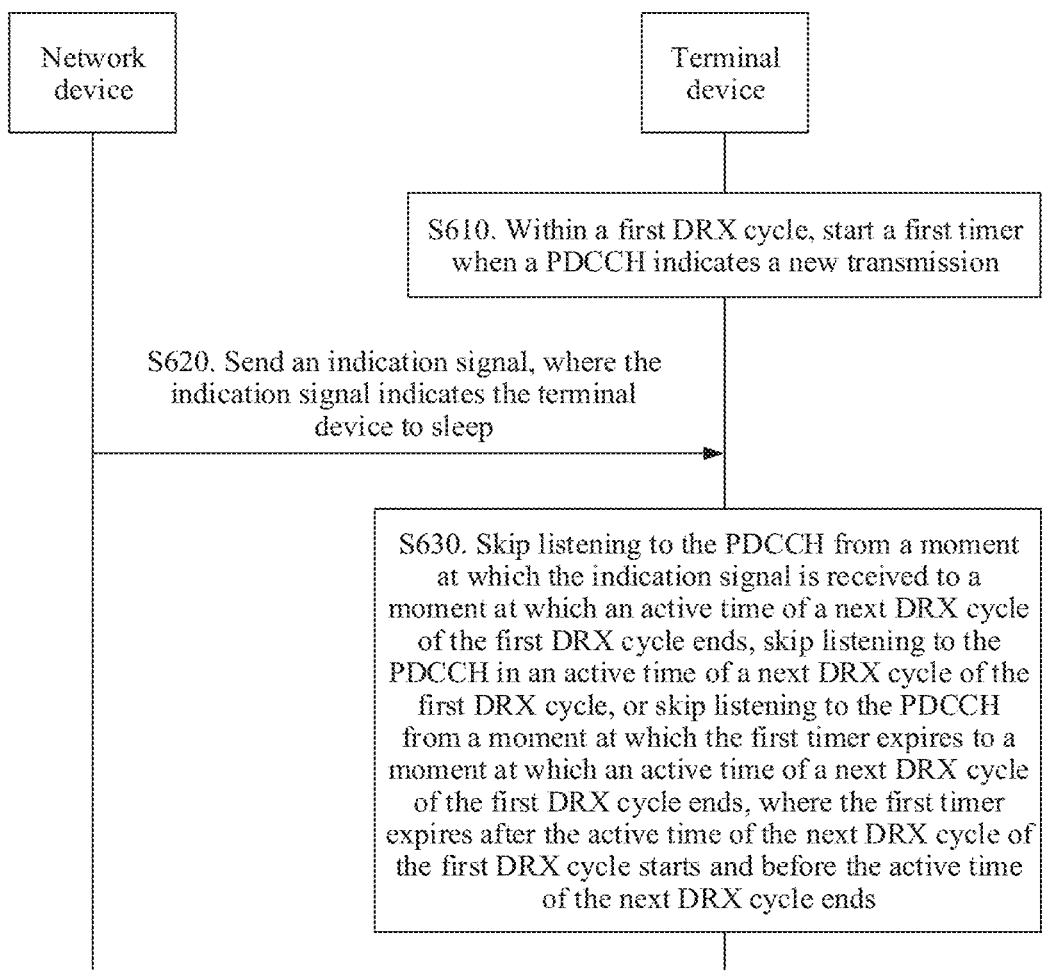
FIG. 6B is a schematic interaction diagram of a communication method according to this application.

For the scenario 2, as shown in FIG. 6B, this application provides a communication method 600A, including the following steps.

S610. Within a first discontinuous reception (DRX) cycle, a terminal device starts a first timer when a physical downlink control channel (PDCCH) indicates a new transmission.

S620. Before the first timer expires, a network device sends an indication signal used to indicate the terminal device to sleep.

S630. The terminal device does not listen to the PDCCH from a moment at which the indication signal is received to a moment at which an active time of a next DRX cycle of the first DRX cycle ends; does not listen to the PDCCH in an active time of a next DRX cycle of the first DRX cycle; or does not listen to the PDCCH from a moment at which the first timer expires to a moment at which an active time of a next DRX cycle of the first DRX cycle ends.

The first timer expires after the active time of the next DRX cycle of the first DRX cycle starts and before the active time of the next DRX cycle ends.

The time domain position at which the indication signal is received is a slot in which the indication signal is received, a symbol in which the indication signal is received, or a subframe in which the indication signal is received. A position after the time domain position at which the indication signal is received is a next slot of the slot in which the indication signal is received, or a next symbol of the symbol in which the indication signal is received, or a next subframe of the subframe in which the indication signal is received.

Specifically, the terminal device may perform the following operations:

stopping timing of the drx-InactivityTimer from the time domain position at which the indication signal is received, and skipping listening to the PDCCH from the time domain position at which the indication signal is received to the moment at which the active time of the next DRX cycle ends;

stopping timing of the drx-InactivityTimer from the time domain position at which the indication signal is received, and skipping listening to the PDCCH in the active time of the next DRX cycle;

stopping timing of the drx-InactivityTimer at a position at which a drx-OndurationTimer in the next DRX cycle is started, and skipping listening to the PDCCH in the active time of the next DRX cycle; or skipping stopping timing of the drx-InactivityTimer, and listening to the PDCCH in a timing period of the drx-InactivityTimer, where a listening time includes a time overlapped by the drx-OndurationTimer and the drx-InactivityTimer, where the terminal device does not listen to the PDCCH in a remaining time of the drx-OndurationTimer.

The remaining time of the drx-OndurationTimer refers to a time period from a time point at which the drx-InactivityTimer expires to a time point at which the drx-OndurationTimer in the next DRX cycle expires, that is, a time period obtained by subtracting the overlapping part of the drx-InactivityTimer and the drx-OndurationTimer from duration of the drx-OndurationTimer.

According to the communication method 600A provided in this application, power consumption of the terminal device can be reduced to different degrees.

Figure 6C:
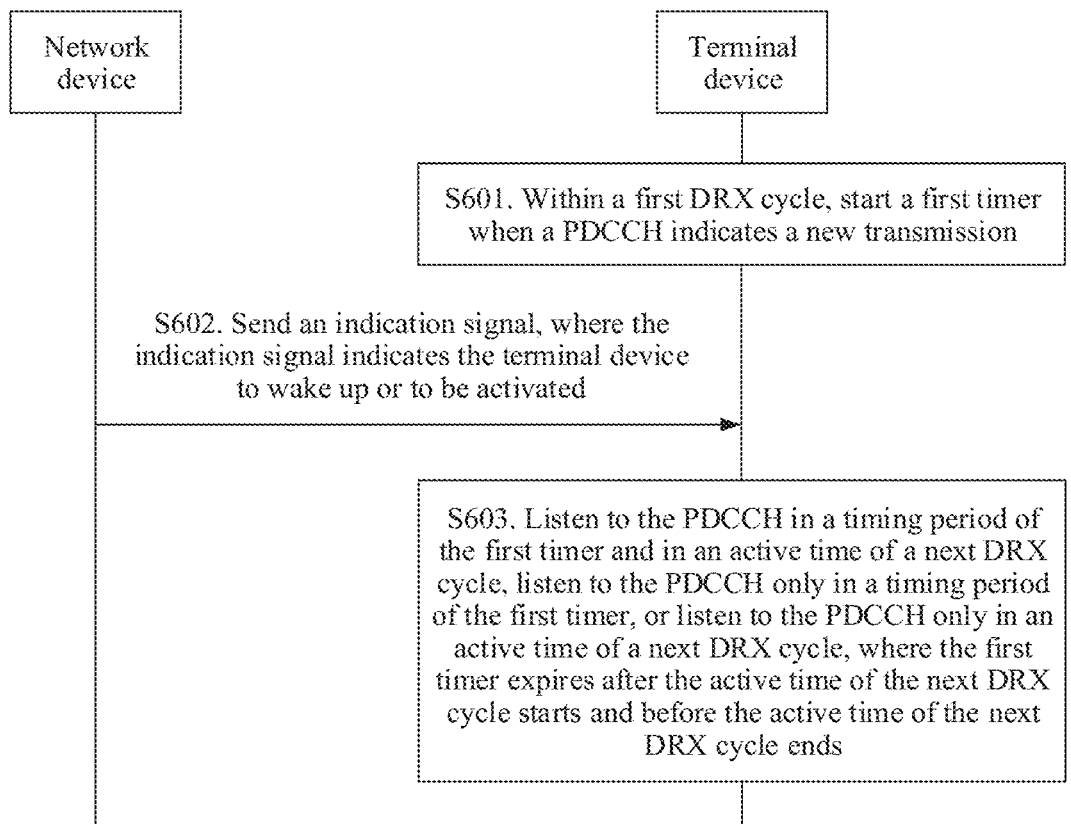
FIG. 6C is another schematic interaction diagram of a communication method according to this application.

For the scenario 2, as shown in FIG. 6C, this application further provides a communication method 600B, including the following steps:

S601. Within a first discontinuous reception (DRX) cycle, a terminal device starts a first timer when a physical downlink control channel (PDCCH) indicates a new transmission.

S602. Before the first timer expires, a network device sends an indication signal used to indicate the terminal device to wake up or to be activated.

S603. The terminal device listens to the PDCCH in a timing period of the first timer and in an active time of a next DRX cycle, listens to the PDCCH only in a timing period of the first timer, or listens to the PDCCH only in an active time of a next DRX cycle.

The first timer expires after the active time of the next DRX cycle starts and before the active time of the next DRX cycle ends.

The communication method provided in Embodiment 2 of this application provides a technical solution in the scenario 2. In the technical solution, the terminal device sleeps in a specific time period so that power consumption can be reduced.

Scenario 3

Figure 7A:
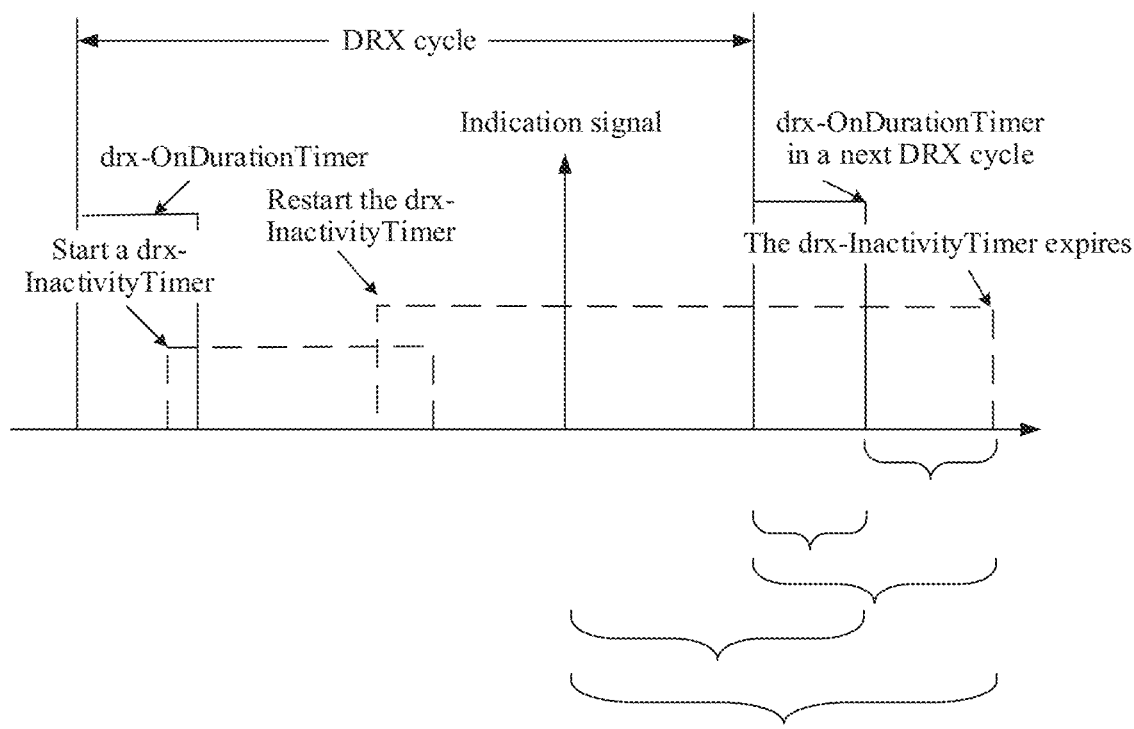
FIG. 7A is another schematic diagram of a relationship between an indication signal and a timer according to this application.

In the scenario 3, timing duration of a drx-InactivityTimer in a first DRX cycle completely overlaps timing duration of a drx-OndurationTimer in a second cycle. To be specific, the drx-InactivityTimer in the first DRX cycle expires after the drx-OndurationTimer in the second cycle expires, the latter is covered by the former in terms of time. Alternatively, the drx-Inactivitytimer in the first DRX cycle expires after an active time of a next DRX cycle ends, as shown in FIG. 7A. If a scheduling message is received in a timing period of a drx-OndurationTimer in the first DRX cycle, the drx-InactivityTimer (the first dashed box in FIG. 7A) is started. If a scheduling message is received again, the drx-InactivityTimer (the second dashed box in FIG. 7A) is restarted. After a drx-OndurationTimer in the next DRX cycle expires, the drx-InactivityTimer expires.

It should be understood that in one DRX cycle, the drx-InactivityTimer may not be restarted, or may be restarted for a plurality of times. This is not limited in this application. In FIG. 7A, one time of restart is used as an example. In the scenario 3, this application provides Embodiment 3 about how a terminal device performs an operation when an indication signal is received.

Embodiment 3

In the scenario 3, as shown in FIG. 7A, when the indication signal is used to indicate the terminal device to sleep, the terminal device may not listen to a PDCCH in a period from a moment at which the active time of the next DRX cycle ends to a moment at which a first timer expires, for example, a time period shown by the first angle bracket in FIG. 7A (there are five angle brackets in total in FIG. 7A, and the five angle brackets are sequentially the first to the fifth angle brackets from top to bottom); may not listen to a PDCCH in the active time of the next DRX cycle, for example, a time period shown by the second angle bracket in FIG. 7A; may not listen to a PDCCH in a period from a moment at which the active time of the next DRX cycle starts to a moment at which a first timer expires, for example, a time period shown in the third angle bracket in FIG. 7A; may not listen to a PDCCH in a period from a moment at which the indication signal is received to a moment at which the active time of the next DRX cycle starts, for example, a time period shown by the fourth angle bracket in FIG. 7A; or may not listen to a PDCCH in a period from a moment at which the indication signal is received to a moment at which a first timer expires, for example, a time period shown in the fifth angle bracket in FIG. 7A.

In addition, the terminal device may further perform different operations on the first timer. Examples are as follows:

The terminal device stops timing of the first timer at or after a time domain position at which the indication signal is received; stops timing of a drx-InactivityTimer when a drx-OndurationTimer in the next DRX cycle is started; or stops timing of a drx-InactivityTimer when a drx-OndurationTimer in the next DRX cycle expires.

In the scenario 3, when the indication signal is used to indicate the terminal device to be activated or to wake up, the terminal device may listen to the PDCCH in a timing period of the drx-InactivityTimer and timing of the drx-OndurationTimer in the next DRX cycle; the terminal device listens to the PDCCH only in a timing period of the drx-InactivityTimer; the terminal device listens to the PDCCH only in a timing period of the drx-OndurationTimer; the terminal device stops timing of the drx-InactivityTimer at the time domain position at which the indication signal is received, and the terminal device listens to the PDCCH only in a timing period of the drx-OndurationTimer in the next DRX cycle; or the terminal device stops listening to the PDCCH at the time domain position at which the indication signal is received, and does not start the drx-OndurationTimer in the next DRX cycle.

Figure 7B:
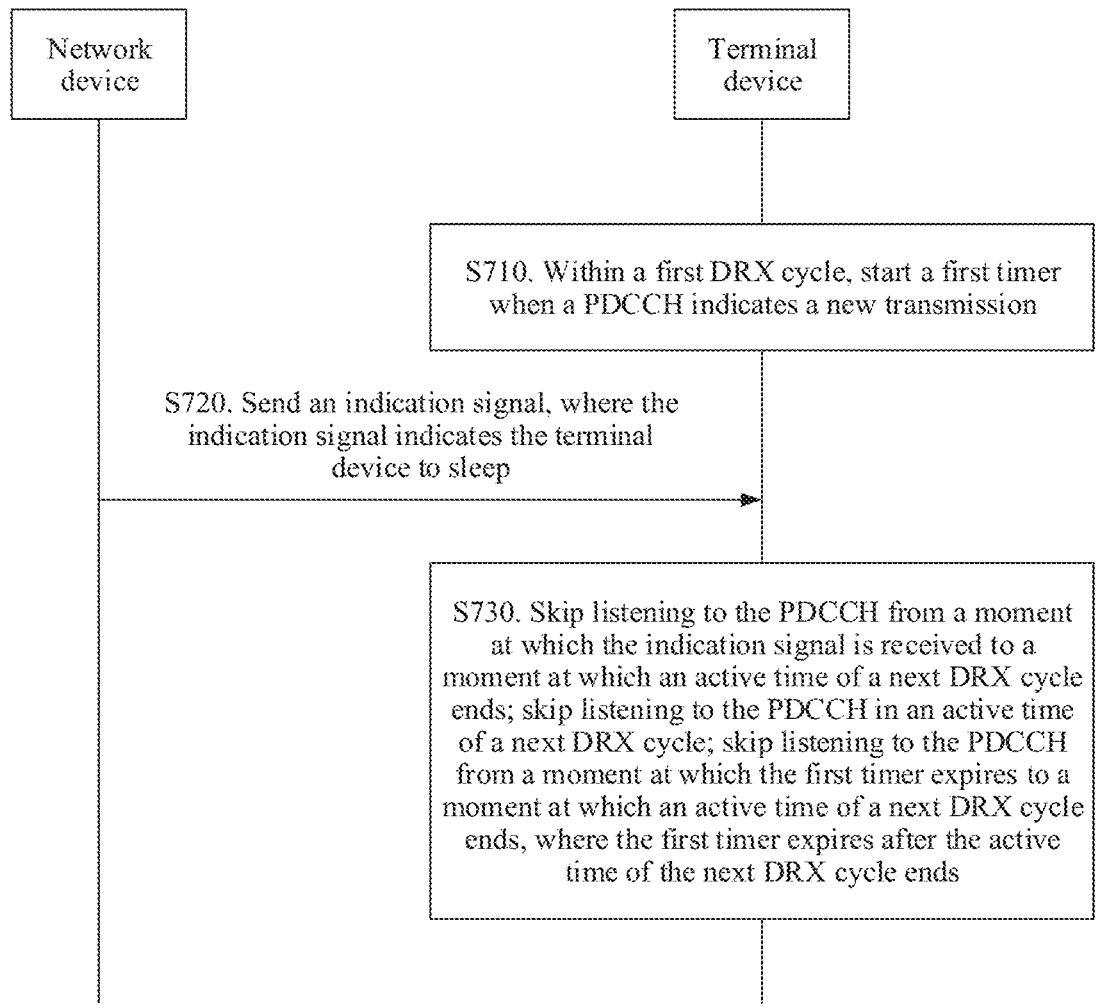
FIG. 7B is a schematic interaction diagram of a communication method according to this application.

For the scenario 3, as shown in FIG. 7B, this application provides a communication method 700A, including the following steps:

S710. Within a first discontinuous reception (DRX) cycle, a terminal device starts a first timer when a physical downlink control channel (PDCCH) indicates a new transmission.

S720. Before the first timer expires, a network device sends an indication signal used to indicate the terminal device to sleep.

S730. The terminal device does not listen to the PDCCH from a moment at which the indication signal is received to a moment at which an active time of a next DRX cycle of the first DRX cycle ends; does not listen to the PDCCH from a moment at which the indication signal is received to a moment at which the first timer expires; does not listen to the PDCCH in an active time of a next DRX cycle of the first DRX cycle; does not listen to the PDCCH from a moment at which an active time of a next DRX cycle of the first DRX cycle starts to a moment at which the first timer expires; or skips listening to the PDCCH from a moment at which an active time of a next DRX cycle of the first DRX cycle ends to a moment at which the first timer expires.

The first timer expires after the active time of the next DRX cycle of the first DRX cycle ends.

The time domain position at which the indication signal is received is a slot in which the indication signal is received, a symbol in which the indication signal is received, or a subframe in which the indication signal is received. The position after the time domain position at which the indication signal is received is a next slot of the slot in which the indication signal is received, or a next symbol of the symbol in which the indication signal is received, or a next subframe of the subframe in which the indication signal is received.

Specifically, the terminal device may perform the following operations:

The terminal device stops timing of the drx-InactivityTimer from the time domain position at which the indication signal is received, and skips listening to the PDCCH from the time domain position at which the indication signal is received to the moment at which the active time of the next DRX cycle ends;

stops timing of the drx-InactivityTimer from the time domain position at which the indication signal is received, and skips listening to the PDCCH from the time domain position at which the indication signal is received to the moment at which the active time of the next DRX cycle starts;

stops timing of the drx-InactivityTimer when the active time of the next DRX cycle starts, and skips listening to the PDCCH in the active time of the next DRX cycle;

skips stopping timing of the drx-InactivityTimer, and skips listening to the PDCCH from the moment at which the active time of the next DRX cycle starts to a moment at which the drx-InactivityTimer expires; or skips stopping timing of the drx-InactivityTimer, and skips listening to the PDCCH from the moment at which the active time of the next DRX cycle ends to a moment at which the drx-Inactivity Timer expires.

This application provides a plurality of possible solutions, and the solutions can reduce power consumption of the terminal device to different degrees.

Figure 7C:
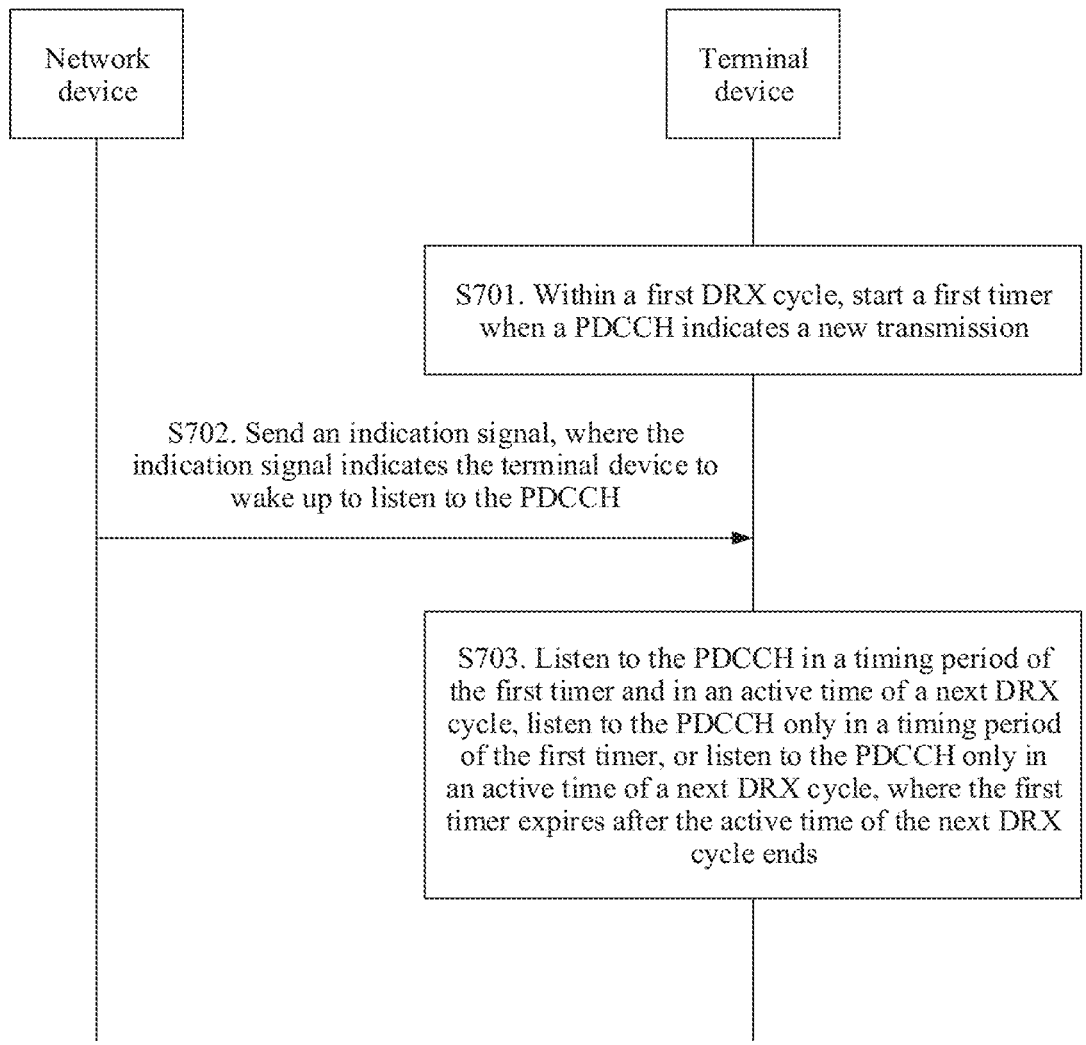
FIG. 7C is another schematic interaction diagram of a communication method according to this application.

For the scenario 3, as shown in FIG. 7C, this application further provides a communication method 700B, including the following steps:

S701. Within a first discontinuous reception (DRX) cycle, a terminal device starts a first timer when a physical downlink control channel (PDCCH) indicates a new transmission.

S702. Before the first timer expires, a network device sends an indication signal used to indicate the terminal device to wake up or to be activated.

S703. The terminal device listens to the PDCCH in a timing period of the first timer and in an active time of a next DRX cycle; the terminal device listens to the PDCCH only in a timing period of the first timer; the terminal device listens to a PDCCH only in an active time of a next DRX cycle; the terminal device stops timing of the first timer at a time domain position at which the indication signal is received and listens to the PDCCH only in an active time of a next DRX cycle; or the terminal device stops listening to the PDCCH at a time domain position at which the indication signal is received and skips starting a drx-OndurationTimer in the next DRX cycle.

The first timer is a drx-InactivityTimer.

The communication method provided in Embodiment 3 of this application provides a technical solution in the scenario 3. In the technical solution, the terminal device sleeps in a specific time period so that power consumption can be reduced.

In addition, this application further provides an embodiment as follows:

When a first timer expires at or after a time domain position at which an indication signal is to be sent, a network device does not send the indication signal, and the terminal device does not receive the indication signal. Regardless of whether the network device needs to indicate the terminal device to listen to a PDCCH in an active time of a next cycle, the network device does not send an indication signal, and the terminal device does not receive the indication signal at a position of the indication signal. The terminal device may listen to the PDCCH in a remaining time of a drx-InactivityTimer and in the active time of the next DRX cycle, or the terminal device keeps listening to the PDCCH from the time domain position of the indication signal to an end position of the active time of the next DRX cycle.

The position at which the indication signal is sent may be configured by the network device. For example, the time domain position at which the network device sends the indication signal is a position obtained by offseting the DRX cycle by X symbols, X slots, or the like, where X is an integer greater than 1. For another example, the time domain position at which the indication signal is sent may alternatively be defined in a standard. For example, the indication signal is sent in a $Y^{th}$ slot of the DRX cycle, or the indication signal is sent in a $Y^{th}$ symbol of the DRX cycle.

It may be understood that in the foregoing method embodiments, a method implemented by the terminal device may alternatively be implemented by a component (for example, a chip or a circuit) that may be used in the terminal, and a method implemented by the network device may alternatively be implemented by a component (for example, a chip or a circuit) that may be used in the network device.

The foregoing describes the method embodiments provided in the embodiments of this application, and the following describes apparatus embodiments provided in the embodiments of this application. It should be understood that descriptions of the apparatus embodiments mutually correspond to the descriptions of the method embodiments. Therefore, for content that is not described in detail, refer to the foregoing method embodiments. For brevity, details are not described herein again.

The foregoing mainly describes the solutions provided in the embodiments of this application from a perspective of interaction between network elements. It may be understood that to implement the foregoing functions, the network elements, for example, a transmit end device or a receive end device, include corresponding hardware structures and/or software modules for performing the functions. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, a transmit end device or a receive end device may be divided into functional modules based on the foregoing method examples. For example, the transmit end device or the receive end device may be divided into functional modules corresponding to functions, or two or more functions may be integrated into one processing module. The integrated module may be implemented in a form of hardware, or may be implemented in a form of a software functional module. It should be noted that, in the embodiments of this application, module division is an example, and is merely a logical function division. In an actual implementation, another division manner may be used. An example in which functional modules are obtained through division based on functions is used below for description.

Figure 8:
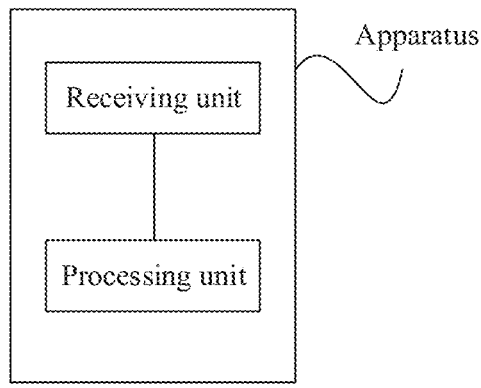
FIG. 8 is a schematic structural diagram of an apparatus according to this application.

FIG. 8 is a schematic block diagram of a terminal device 800 according to an embodiment of this application. The terminal device 800 may correspond to the terminal device in the foregoing method embodiments. In an embodiment, the terminal device 800 includes the following units:

a processing unit 810, configured to: within a first discontinuous reception (DRX) cycle, start a first timer when a physical downlink control channel (PDCCH) indicates a new transmission; and a receiving unit 820, configured to receive, before the first timer expires, an indication signal used to indicate the apparatus to sleep.

The processing unit 810 is further configured to: skip listening to the PDCCH from a moment at which the indication signal is received to a moment at which an active time of a next DRX cycle of the first DRX cycle ends; skip listening to the PDCCH in an active time of a next DRX cycle of the first DRX cycle; skip listening to the PDCCH from a moment at which the first timer expires to a moment at which an active time of a next DRX cycle of the first DRX cycle ends; or skip listening to the PDCCH from a moment at which an active time of a next DRX cycle of the first DRX cycle starts to a moment at which the first timer expires, where the first timer expires after the active time of the next DRX cycle of the first DRX cycle starts and before the active time of the next DRX cycle ends, or the first timer expires after the active time of the next DRX cycle of the first DRX cycle ends.

According to the solution provided in this application, the terminal device is indicated to sleep so that overheads of the terminal device can be reduced.

Further, the processing unit 810 is further configured to: when the first timer expires after the active time of the next DRX cycle of the first DRX cycle starts and before the active time of the next DRX cycle ends, skip listening to the PDCCH from the moment at which the indication signal is received to the moment at which the active time of the next DRX cycle of the first DRX cycle ends, and stop timing of the first timer when the active time of the next DRX cycle of the first DRX cycle starts.

Further, the processing unit 810 is further configured to: when the first timer expires after the active time of the next DRX cycle of the first DRX cycle starts and before the active time of the next DRX cycle ends, skip listening to the PDCCH in the active time of the next DRX cycle of the first DRX cycle, and stop timing of the first timer when the active time of the next DRX cycle of the first DRX cycle starts.

Further, the processing unit 810 is further configured to: when the first timer expires after the active time of the next DRX cycle of the first DRX cycle ends, skip listening to the PDCCH from the moment at which the indication signal is received to the moment at which the active time of the next DRX cycle of the first DRX cycle ends, and stop timing of the first timer when the active time of the next DRX cycle of the first DRX cycle starts.

Further, the processing unit 810 is further configured to: when the first timer expires after the active time of the next DRX cycle of the first DRX cycle ends, skip listening to the PDCCH in the active time of the next DRX cycle of the first DRX cycle, and stop timing of the first timer when the active time of the next DRX cycle of the first DRX cycle starts.

Further, the processing unit 810 is further configured to: when the first timer expires after the active time of the next DRX cycle of the first DRX cycle ends, skip listening to the PDCCH from the moment at which the indication signal is received to the moment at which the first timer expires, and stop timing of a second timer, where the second timer is used for timing an active time of a DRX cycle.

Therefore, according to the solution provided in this application, the terminal device sleeps in a specific time period so that power consumption can be reduced.

An embodiment of this application further provides a first communications apparatus. The first communications apparatus may be a terminal device or a chip. The first communications apparatus may be configured to perform actions performed by the terminal device in the foregoing method embodiments.

Figure 9:
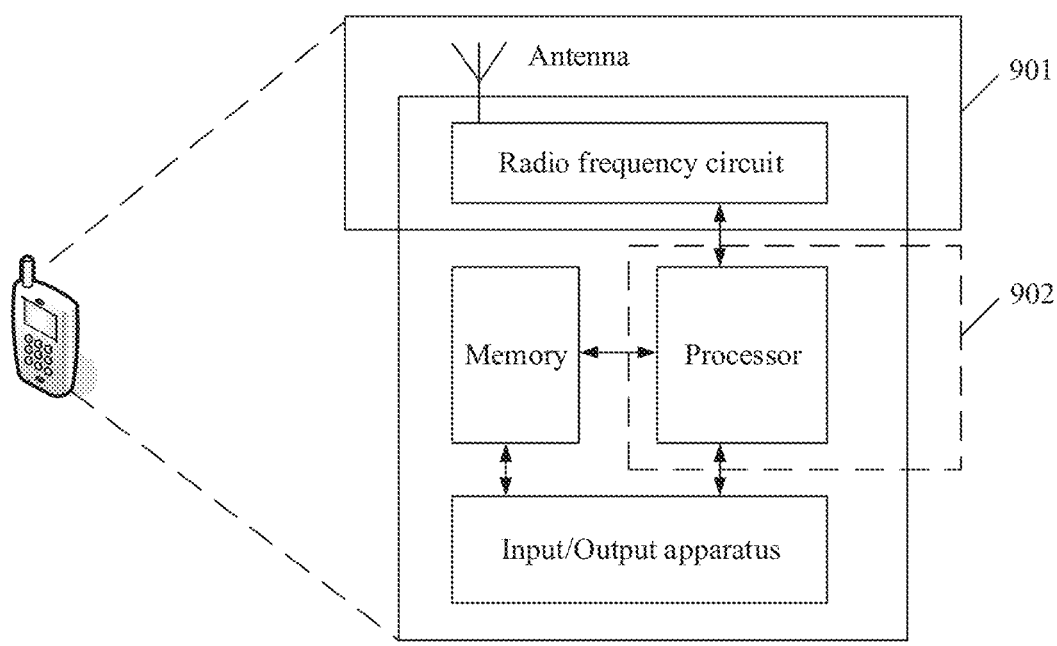
FIG. 9 is a schematic structural diagram of an apparatus according to this application.

When the first communications apparatus is a terminal device, FIG. 9 is a simplified schematic structural diagram of a terminal device. For ease of understanding and convenience of figure illustration, an example in which the terminal device is a mobile phone is used in FIG. 9. As shown in FIG. 9, the terminal device includes a processor, a memory, a radio frequency circuit, an antenna, and an input/output apparatus. The processor is mainly configured to: process a communications protocol and communications data, control the terminal device, execute a software program, process data of the software program, and so on. The memory is mainly configured to store the software program and data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to: receive data input by a user, and output data to the user. It should be noted that some types of terminal devices may have no input/output apparatus.

When data needs to be sent, after performing baseband processing on the to-be-sent data, the processor outputs a baseband signal to the radio frequency circuit; and the radio frequency circuit performs radio frequency processing on the baseband signal and then sends a radio frequency signal to the outside in a form of an electromagnetic wave by using the antenna. When data is sent to the terminal device, the radio frequency circuit receives a radio frequency signal through the antenna, converts the radio frequency signal into a baseband signal and outputs the baseband signal to the processor; and the processor converts the baseband signal into data, and processes the data. For ease of description, FIG. 9 shows only one memory and processor. In an actual terminal device product, there may be one or more processors and one or more memories. The memory may also be referred to as a storage medium, a storage device, or the like. The memory may be disposed independent of the processor, or may be integrated with the processor. This is not limited in the embodiments of this application.

In the embodiments of this application, the antenna and the radio frequency circuit that have receiving and sending functions may be considered as a transceiver unit of the terminal device, and the processor that has a processing function may be considered as a processing unit of the terminal device.

As shown in FIG. 9, the terminal device includes a transceiver unit 901 and a processing unit 902. The transceiver unit may also be referred to as a transceiver, a transceiver machine, a transceiver apparatus, or the like. The processing unit may also be referred to as a processor, a processing board, a processing module, a processing apparatus, or the like. Optionally, a component for implementing a receiving function in the transceiver unit 901 may be considered as a receiving unit, and a component for implementing a sending function in the transceiver unit 901 may be considered as a sending unit. That is, the transceiver unit 901 includes a receiving unit and a sending unit. The transceiver unit may also be sometimes referred to as a transceiver machine, a transceiver, a transceiver circuit, or the like. The receiving unit may also be sometimes referred to as a receiver machine, a receiver, a receiver circuit, or the like. The sending unit may also be sometimes referred to as a transmitter machine, a transmitter, a transmitter circuit, or the like.

Figure 5B:
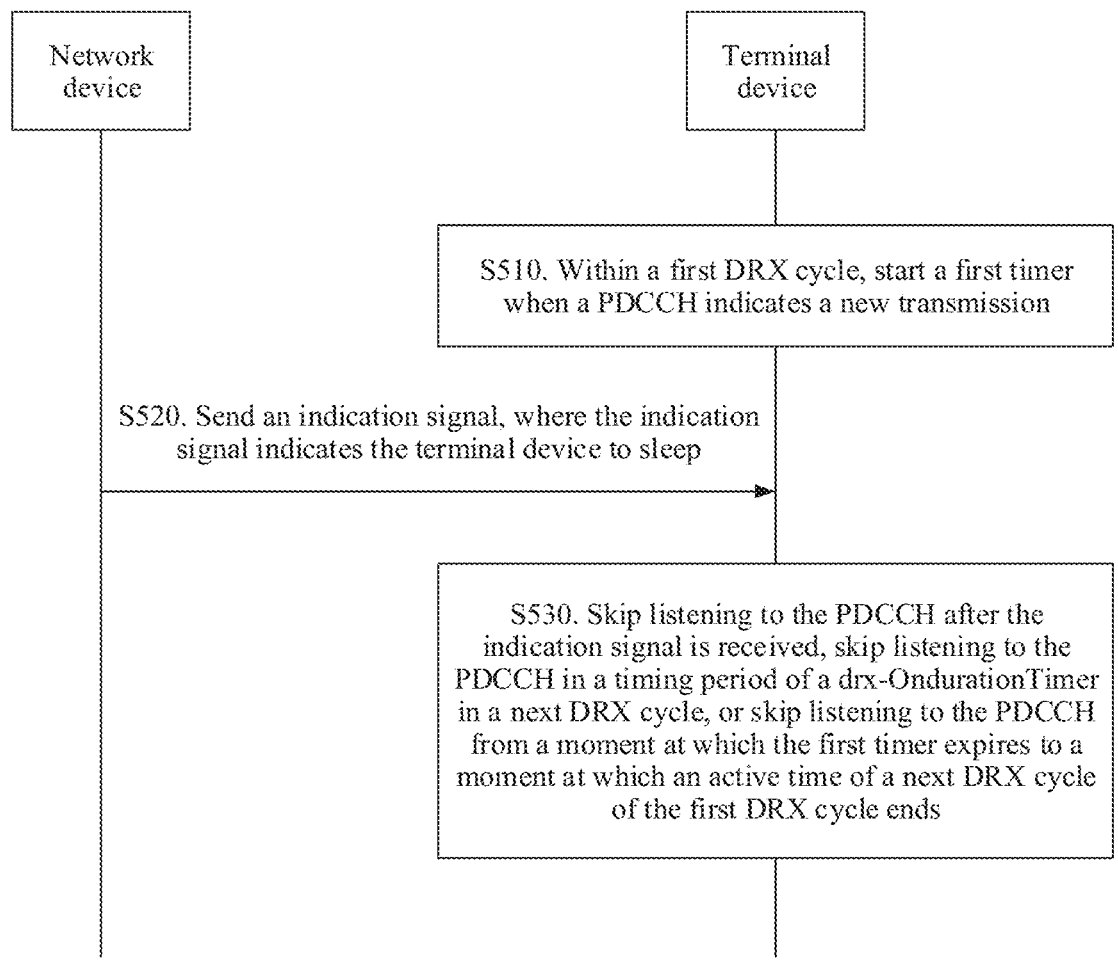
FIG. 5B is a schematic interaction diagram of a communication method according to this application.
Figure 5C:
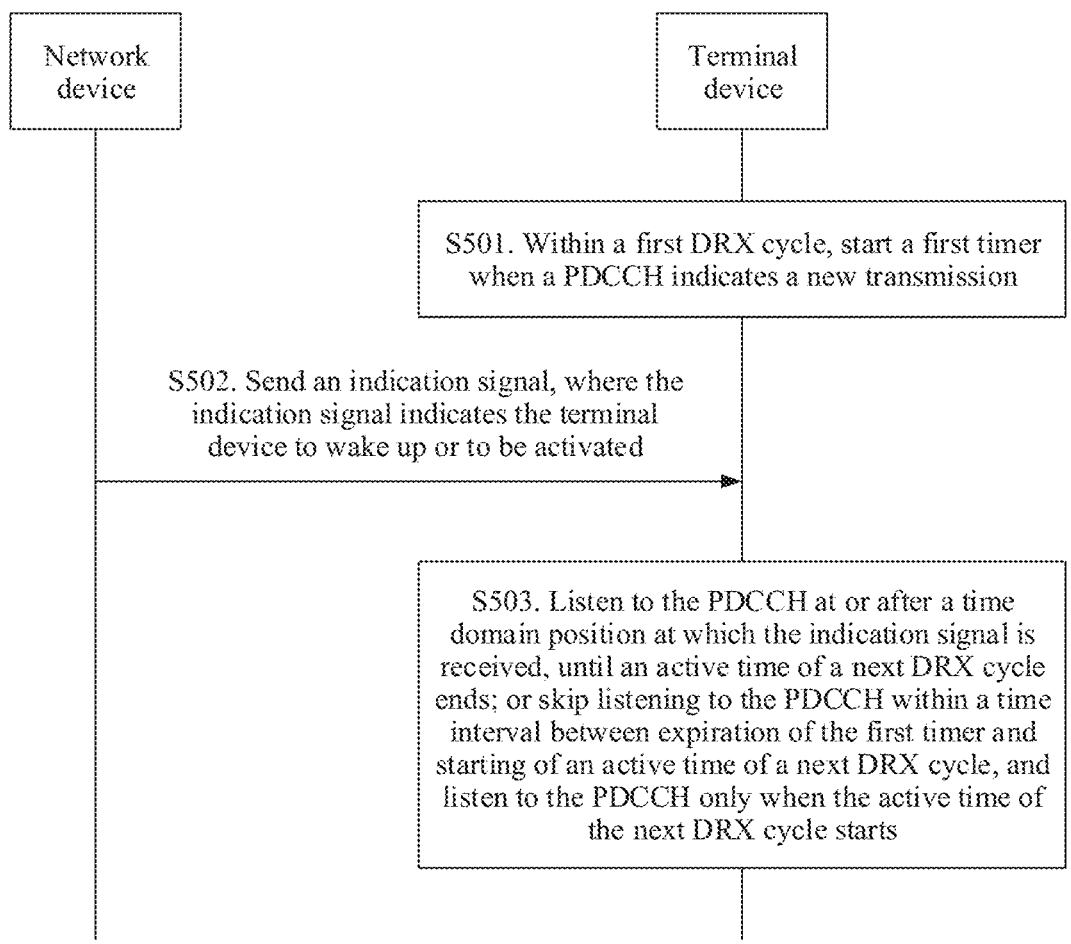
FIG. 5C is another schematic interaction diagram of a communication method according to this application.

For example, in an implementation, the processing unit 902 is configured to perform steps 510 and 530 in FIG. 5B, the processing unit 902 is configured to perform steps 501 and 503 in FIG. 5C, the processing unit 902 is configured to perform steps 610 and 630 in FIG. 6B, the processing unit 902 is configured to perform steps 601 and 603 in FIG. 6C, the processing unit 902 is configured to perform steps 710 and 730 in FIG. 7B, or the processing unit 902 is configured to perform steps 701 and 703 in FIG. 7C. The transceiver unit 901 is configured to perform step 520 in FIG. 5B, configured to perform step 502 in FIG. 5C, configured to perform step 620 in FIG. 6B, configured to perform step 602 in FIG. 6C, configured to perform step 720 in FIG. 7B, or configured to perform step 702 in FIG. 7C, and/or the transceiver unit 901 is configured to perform another receiving/sending step on a terminal device side.

It should be understood that FIG. 9 is merely an example instead of a limitation. The terminal device including the transceiver unit and the processing unit may not depend on the structure shown in FIG. 9.

When the first communications apparatus is a chip, the chip includes a transceiver unit and a processing unit. The transceiver unit may be an input/output circuit or a communications interface. The processing unit is a processor, a microprocessor, or an integrated circuit integrated on the chip.

An embodiment of this application further provides a computer-readable storage medium. The computer-readable storage medium stores a computer program. When the computer program is executed by a computer, the computer is enabled to implement the method on a terminal device side or the method on a network device side in the foregoing method embodiments.

An embodiment of this application further provides a computer program product including instructions. When the instructions are executed by a computer, the computer is enabled to implement the method on a terminal device side or the method on a network device side in the foregoing method embodiments.

For explanations and beneficial effects of related content of any of the communications apparatuses provided above, refer to the corresponding method embodiment provided above, and details are not described herein again.

In the embodiments of this application, the terminal device or the network device includes a hardware layer, an operating system layer running on the hardware layer, and an application layer running on the operating system layer. The hardware layer includes hardware such as a central processing unit (CPU), a memory management unit (MMU), and a memory (which is also referred to as a main memory). The operating system may be any one or more of computer operating systems implementing service processing through a process, for example, a Linux operating system, a Unix operating system, an Android operating system, an iOS operating system, and a Windows operating system. The application layer includes applications such as a browser, an address book, word processing software, and instant messaging software. In addition, a specific structure of an execution body of a method provided in the embodiments of this application is not specifically limited in the embodiments of this application, provided that a program that records code for the method provided in the embodiments of this application can be run to perform communication according to the method provided in the embodiments of this application. For example, the method provided in the embodiments of this application may be performed by a terminal device, a network device, or a functional module that is in a terminal device or a network device and that can invoke and execute the program.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to a magnetic storage component (for example, a hard disk, a floppy disk, or a magnetic tape), an optical disc (for example, a compact disc (CD), or a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable medium" may include but is not limited to a radio channel, and various other media that can store, contain, and/or carry instructions and/or data.

It should be understood that, the processor mentioned in this embodiment of this application may be a central processing unit (CPU), or another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor, or the like.

It may be understood that the memory mentioned in this embodiment of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA or another programmable logic device, a discrete gate or a transistor logic device, or a discrete hardware component, the memory (a storage module) is integrated into the processor.

It should be noted that the memory described in this specification aims to include but is not limited to these memories and any memory of another proper type.

A person of ordinary skill in the art may be aware that units and algorithm steps in the examples described with reference to the embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the described system, apparatus, and unit, refer to a corresponding process in the foregoing method embodiments.

In the several embodiments provided in this application, it should be understood that the disclosed system, apparatus, and method may be implemented in other manners. For example, the described apparatus embodiment is merely an example. For example, the division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the method described in the embodiments of this application. The storage medium includes any medium that can store program code such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   within a first discontinuous reception (DRX) cycle, starting, by a terminal device, a first timer when a physical downlink control channel (PDCCH) indicates a new transmission; and
   receiving, by the terminal device at a moment before the first timer expires, an indication signal used to indicate the terminal device to sleep, wherein the moment is configured by a network device for the terminal device;
   wherein the method further comprises:
     skipping, by the terminal device, listening to the PDCCH from the moment at which the indication signal is received to a moment at which an active time of a second DRX cycle following the first DRX cycle ends;
     skipping, by the terminal device, listening to the PDCCH in an active time of a second DRX cycle following the first DRX cycle;
     skipping, by the terminal device, listening to the PDCCH from a moment at which the first timer expires to a moment at which an active time of a second DRX cycle following the first DRX cycle ends; or
     skipping, by the terminal device, listening to the PDCCH from a moment at which an active time of a second DRX cycle following the first DRX cycle starts to a moment at which the first timer expires, wherein:
     the first timer expires after the active time of the second DRX cycle starts and before the active time of the second DRX cycle ends, or the first timer expires after the active time of the second DRX cycle ends; and
   wherein the method further comprises:
     when the first timer expires after the active time of the second DRX cycle starts and before the active time of the second DRX cycle ends, skipping, by the terminal device, listening to the PDCCH from the moment at which the indication signal is received to the moment at which the active time of the second DRX cycle ends, and stopping, by the terminal device, timing of the first timer when the active time of the second DRX cycle starts;
     when the first timer expires after the active time of the second DRX cycle starts and before the active time of the second DRX cycle ends, skipping, by the terminal device, listening to the PDCCH in the active time of the second DRX cycle, and stopping, by the terminal device, timing of the first timer when the active time of the second DRX cycle starts;
     when the first timer expires after the active time of the second DRX cycle ends, skipping, by the terminal device, listening to the PDCCH from the moment at which the indication signal is received to the moment at which the active time of the second DRX cycle ends, and stopping, by the terminal device, timing of the first timer when the active time of the second DRX cycle starts; or when the first timer expires after the active time of the second DRX cycle following ends, skipping, by the terminal device, listening to the PDCCH from the moment at which the indication signal is received to the moment at which the first timer expires, and stopping, by the terminal device, timing of a second timer, wherein the second timer is used for timing an active time of a DRX cycle.

2. The method according to claim 1, wherein the indication signal is not sent by the network device.

3. The method according to claim 1, wherein the first timer is a discontinuous reception inactivity timer (drx-Inactivity Timer).

4. The method according to claim 1, wherein the indication signal is a go-to-sleep signal (GTSS).

5. An apparatus, comprising:
at least one processor;
one or more memories coupled to the at least one processor and storing programming instructions for execution by the at least one processor to:
within a first discontinuous reception (DRX) cycle, start a first timer when a physical downlink control channel (PDCCH) indicates a new transmission; and
a receiver, the receiver configured to receive, at a moment before the first timer expires, an indication signalused to indicate the apparatus tosleep, wherein the moment is configured by a network device for the apparatus, and wherein:
the programming instructions are for execution by the at least one processor to:
skip listening to the PDCCH from the moment at which the indication signal is received to a moment at which an active time of a second DRX cycle following the first DRX cycle ends;
skip listening to the PDCCH in an active time of a second DRX cycle following the first DRX cycle;
skip listening to the PDCCH from a moment at which the first timer expires to a moment at which an active time of a second DRX cycle following the first DRX cycle ends; or
skip listening to the PDCCH from a moment at which an active time of a second DRX cycle following the first DRX cycle starts to a moment at which the first timer expires, wherein:
the first timer expires after the active time of the second DRX cycle following the first DRX cycle starts and before the active time of the second DRX cycle following the first DRX cycle ends, or the first timer expires after the active time of the second DRX cycle following the first DRX cycle ends; and
wherein the programming instructions are for execution by the at least one processor to:

when the first timer expires after the active time of the second DRX cycle following the first DRX cycle starts and before the active time of the second DRX cycle following the first DRX cycle ends, skip listening to the PDCCH from the moment at which the indication signal is received to the moment at which the active time of the second DRX cycle following the first DRX cycle ends, and stop timing of the first timer when the active time of the second DRX cycle following the first DRX cycle starts;

when the first timer expires after the active time of the second DRX cycle following the first DRX cycle starts and before the active time of the second DRX cycle following the first DRX cycle ends, skip listening to the PDCCH in the active time of the second DRX cycle following the first DRX cycle, and stop timing of the first timer when the active time of the second DRX cycle following the first DRX cycle starts;

when the first timer expires after the active time of the second DRX cycle following the first DRX cycle ends, skip listening to the PDCCH from the moment at which the indication signal is received to the moment at which the active time of the second DRX cycle following the first DRX cycle ends, and stop timing of the first timer when the active time of the second DRX cycle following the first DRX cycle starts; or when the first timer expires after the active time of the second DRX cycle following the first DRX cycle ends, skip listening to the PDCCH from the moment at which the indication signal is received to the moment at which the first timer expires, and stop timing of a second timer, wherein the second timer is used for timing an active time of a DRX cycle.

6. The apparatus according to claim 5, wherein the second timer is a discontinuous reception on duration timer (drx-OndurationTimer).

7. The apparatus according to claim 5, wherein the first timer is a discontinuous reception inactivity timer (drx-Inactivity Timer).

8. The apparatus according to claim 5, wherein the indication signal is a go-to-sleep signal (GTSS).

9. The apparatus according to claim 5, wherein the receiver is further configured to receive an index of a control resource set from the network device, and wherein the control resource set is used to receive the indication signal.

10. The apparatus according to claim 5, wherein both the first DRX cycle and the second DRX cycle are short DRX cycles; or the first DRX cycle is a short DRX cycle, and the second DRX cycle is a long DRX cycle.

* * * * *

UNITED STATES PATENT AND TRADEMARK OFFICE
CERTIFICATE OF CORRECTION

PATENT NO. : 12,219,487 B2
APPLICATION NO. : 17/365368
DATED : February 4, 2025
INVENTOR(S) : Kuandong Gao, Huang Huang and Mao Yan It is certified that error appears in the above-identified patent and that said Letters Patent is hereby corrected as shown below:

In the Claims

In Column 22, In Line 12, In Claim 1, delete "bya" and insert -- by a --.

In Column 23, In Line 14-15, In Claim 3, delete "(drx-Inactivity Timer)." and insert -- (drx-InactivityTimer). --.

In Column 23, In Line 27, In Claim 5, delete "signalused" and insert -- signal used --.

In Column 23, In Line 28, In Claim 5, delete "tosleep," and insert -- to sleep, --.

In Column 24, In Line 42-43 (Approx.), In Claim 7, delete "(drx-Inactivity Timer)." and insert -- (drx-InactivityTimer). --.

Signed and Sealed this
Fifteenth Day of July, 2025

Coke Morgan Stewart
*Acting Director of the United States Patent and Trademark Office*